Feb. 20, 1962
J. K. BECKETT
3,021,865
PRESSURE REGULATOR
Filed Oct. 26, 1959
2 Sheets-Sheet 1
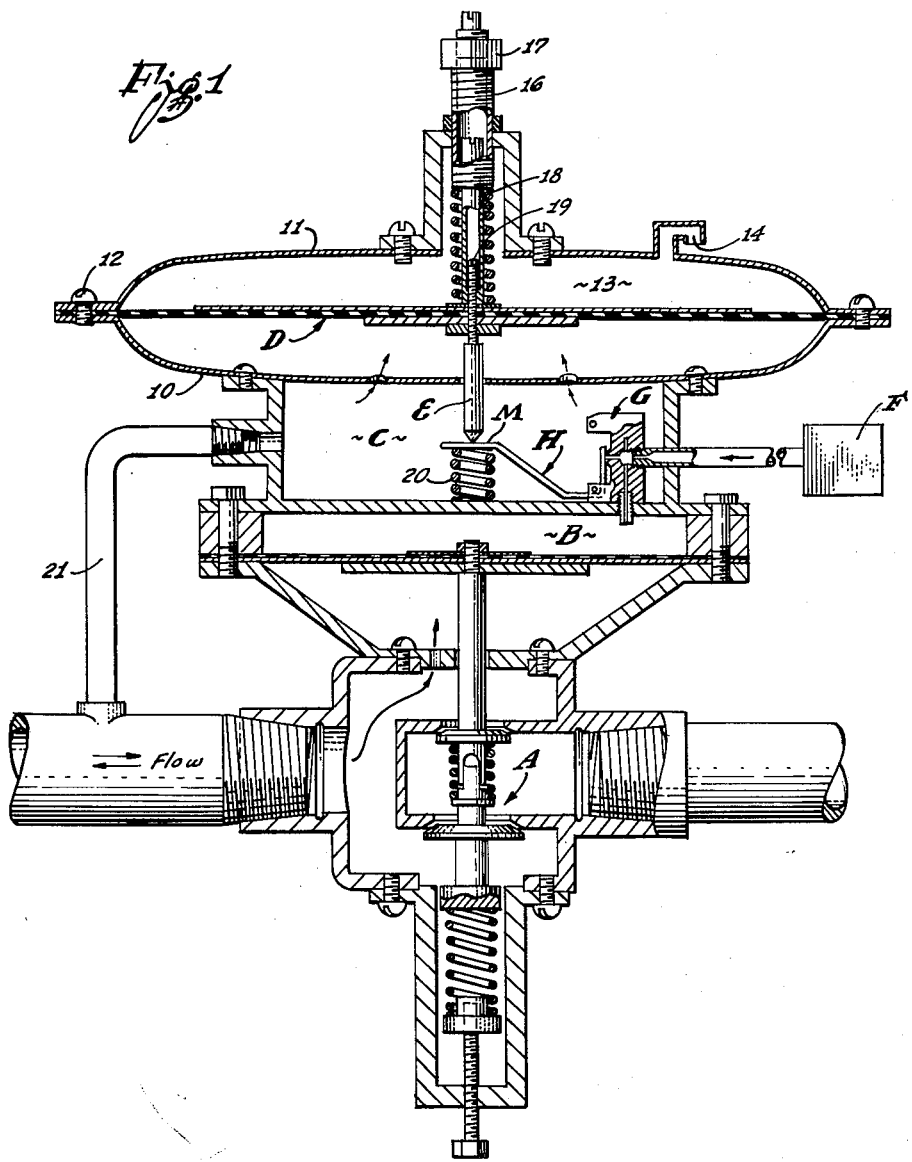
INVENTOR:
Joseph K. Beckett
By Gene W. Arant
Attorney.

Feb. 20, 1962 J. K. BECKETT 3,021,865
PRESSURE REGULATOR
Filed Oct. 26, 1959 2 Sheets-Sheet 2

INVENTOR:
Joseph K. Beckett

By Gene W. Arant
Attorneys.

3,021,865
PRESSURE REGULATOR
Joseph K. Beckett, Yorba Linda, Calif.
(P.O. Box 264, Bakersfield, Calif.)
Filed Oct. 26, 1959, Ser. No. 848,840
2 Claims. (Cl. 137—270)

The present invention relates to pressure regulating apparatus which is responsive to a pair of input pressures, applied at separate input points, for producing an output pressure as a composite function thereof.

Although many pressure regulators achieve their control functions by utilizing only a single feedback loop of the pressure being controlled, there are also many pressure regulators which utilize a double or multiple feedback loop for control purposes. Furthermore, it is sometimes desired to utilize pressure from a separate source, outside the system in which the pressure is being controlled, in addition to a feedback loop involving the pressure being controlled. It will thus be seen that there are many applications of pressure regulators in which an output or control pressure is generated as a composite function of two or more separately applied input pressures.

One object of the invention is to provide improved pressure regulating apparatus for producing a single control pressure as a composite function of a pair of separately applied input pressures.

Another object of the invention is to provide a pressure regulator which responds to the pressure being controlled, but which at the same time receives a major part of its operating energy from an independent pressure source.

A further object of the invention is to provide a pressure control valve which is simply and inexpensively constructed, yet which is easily reversible for use in different applications.

Yet another object of the invention is to provide an improved pressure regulator for precisely controlling near-atmospheric pressures.

The objects and advantages of the invention will be more fully understood from the following description considered in conjunction with the accompanying drawing, in which:

FIGURE 1 is a cross-sectional view of a pressure regulator embodying the invention;

Referring now to FIGURE 1 it will be seen that the pressure regulator includes a main valve A inserted serially in a pipe line. The action of main valve A is controlled by a pressure chamber B, and the pressure regulator also includes a pilot valve chamber C which receives pressure via a line 21 from one side of the main valve A. A spring-biased diaphragm D forms the upper boundary of pilot valve chamber C, and moves in accordance with pressure changes within the chamber. A member E disposed within the pilot valve chamber and rigidly coupled to diaphragm D is rectilinearly movable as the pressure changes within pilot valve chamber C.

Main valve A is coupled in series between first and second pipe line sections. The first pipe line section, appearing on the left in FIGURE 1, is coupled to a storage tank, not shown, and the intent and purpose of the apparatus is to control the pressure level within the storage tank and the first pipe line section.

An independent source F produces a relatively constant pressure which is utilized to provide necessary operating energy to the regulating mechanism of FIGURE 1. Independent pressure source F has no connection to the fluid storage tank, or to the first pipe line section, other than as shown in FIGURE 1. A valve body G disposed within pilot valve chamber C provides fluid communication between the independent pressure source F, pilot valve chamber C, and the control pressure chamber B associated with the main valve. A valve member H responds to the movement of member E for controlling the action of valve body G.

Figure 3:
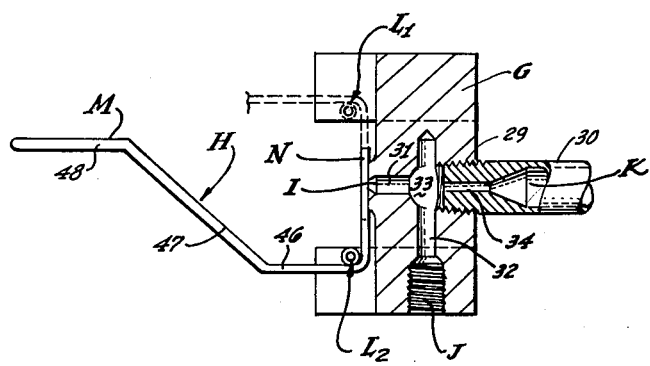
FIGURE 3 is a cross-sectional view of the valve of FIGURE 2.
Figure 2:
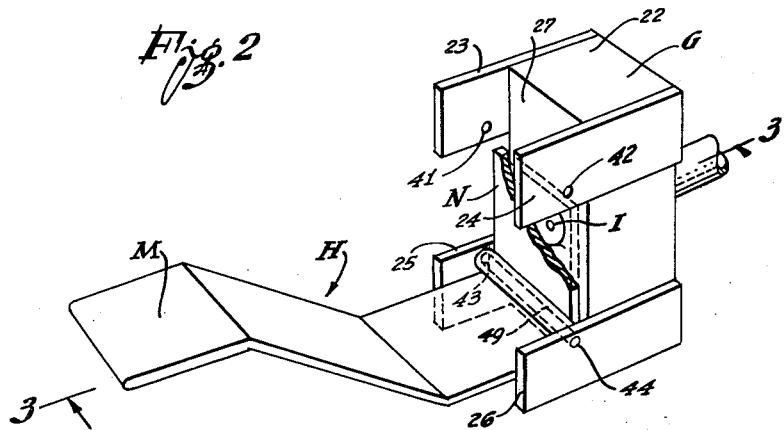
FIGURE 2 is a perspective view of a pressure control valve utilized in the pressure regulator of FIGURE 1.

Referring now to FIGURES 2 and 3 it will be seen that the valve body G on one exterior surface portion thereof has a first opening I, while a second opening J and a third opening K are provided on other exterior surface portions of the valve body. These openings provide fluid passageways which are interconnected internally of the valve body G. Opening I is coupled to pilot valve chamber C, opening J to control pressure chamber B, and opening K to independent pressure source F. Fulcrum means L provided on the valve body G pivotally support the valve member H for selectively closing the first opening I. The valve member H includes a long lever arm M and a short lever arm N which are joined together at a right angle, at the point of pivotal support. Valve body G is so positioned within the pilot valve chamber C, and long lever arm M has its outer end coupled to the moveable member E, so that in response to rectilinear movement of the member E the short lever arm N of the valve member H is operable to selectively open or close the first opening I in the valve body G.

In the valve mechanism of FIGURES 2 and 3 it will be seen that the configuration of the internal passageways is such that the transmission of pressure or vacuum between independent source F and control pressure chamber B is relatively restricted. On the other hand, when valve member H is in such a position that opening I in the valve body is not obstructed, the transmission of pressure or vacuum between pilot valve chamber C and the control pressure chamber B is relatively unrestricted. Therefore, when valve member H is in its open position as distinguished from its closed position in which it closes off the opening I, the transmission of pressure or vacuum between source F and pressure chamber B is substantially more restricted than is the transmission of pressure or vacuum between pilot valve chamber C and pressure chamber B. The closing movement of valve member H progressively limits the transmission of pressure or vacuum between pilot valve chamber C and control pressure chamber B, and when valve member H completely closes off the opening I the result is that the pressure level within control pressure chamber B is controlled entirely by the independent source F.

The pilot valve arrangement will now be more specifically described.

A lower housing portion 10 and an upper housing portion 11 are fastened together at their peripheral edges by means of screws 12 so as to support the diaphragm D therebetween. Chamber C is therefore formed by the lower housing portion 10 together with diaphragm D. Above diaphragm D is another chamber 13 which is vented to the atmosphere by means of an opening 14 provided in the upper housing portion 11.

Upper housing portion 11 is provided at its upper center with a threaded opening 16, which receives an externally threaded and internally hollow adjustment screw 17. A vertically disposed helical spring 18 is compressed between the lower end of adjustment screw 17 and the upper surface of diaphragm D. Member E is in the form of a shaft or plunger having a pointed lower end, and whose upper portion is threaded so as to be received in a suitable threaded opening provided in diaphragm D concentric to spring 18. The upper extremity 19 of member E is adapted to be engaged by a screwdriver inserted through the hollow interior of adjustment screw 17, thus permitting manual adjustment of the distance by which member E extends below diaphragm D. Lever arm M of valve member H is interposed beneath the pointed lower end of member E, and a vertically disposed helical spring 20 has its upper end engaging the under surface of lever arm M while its lower end rests upon the inner surface of lower housing portion 10.

It is therefore apparent that the spring tension applied to diaphragm D may be varied simply by adjusting the adjustment screw 17. Also, the downward extension of member E below the diaphragm may be adjusted at 19. The normal setting of the mechanism is such that valve member H just closes the opening I of valve body G at the established control pressure level of chamber C. At higher pressure levels valve H remains closed. At lower pressure levels valve H is open, and closes as the pressure increases toward the control level.

Reference is now made to FIGURES 2 and 3 for a description of structural details of the valve body G and valve member H.

Valve body G includes an elongated member 22 which is vertically disposed, having a parallel pair of horizontally extending side plates 23, 24 (constituting a first fulcrum means $L_1$) fastened to its upper end and a similar pair of horizontally extending parallel side plates 25, 26 ($L_2$) fastened to its lower end. All of the projecting side plates surround one surface portion 27 of the member 22, the opening I being formed in the approximate center of the surface portion 27. Opening J is formed in the lower end of member 22. On the side of member 22 opposite opening I there is provided a threaded opening 29 which receives a threaded duct 30. Duct 30 is hollow with the interior thereof providing the opening K as previously described. Opening I is extended internally of the member 22 so as to provide a first passageway 31, and opening J is extended providing a second passageway 32, the passageways 31 and 32 being in communication with each other at a junction point 33 adjacent the end of duct 30. At its end adjacent the junction point 33, the interior opening of duct 30 is restricted so as to provide a small orifice 34.

Orifice 34 is substantially smaller than passageway 31, while passageway 32 is substantially the same in cross-sectional area as passageway 31, hence the fluid passageway from opening J to opening K is substantially more restricted than from opening J to opening I. Valve body G is positioned within pilot valve chamber C in such a way that opening J and passageway 32 provide a fluid passageway to the control pressure chamber B. At the same time the duct 30 and opening K extend through a wall of housing portion 10 to provide a fluid passageway to the independent pressure source F.

An aligned pair of openings 41, 42 are provided in the side plates 23, 24, respectively, while a similar aligned pair of openings 43, 44 are provided in the side plates 25, 26. Openings 41, 42 are the same distance above opening I as the openings 43, 44 are below it. In the valve member H the long lever arm M includes a short straight portion 46 forming a perpendicular juncture with one end of the short lever arm N, an angled portion 47 which extends outward from the end of short portion 46 in a direction away from lever arm N, and another short portion 48 at the end of angled portion 47 which extends still further away from the short lever arm N but is aligned substantially with the center thereof. It is the short portion 48 of lever arm M which is engaged by the pointed lower end of plunger E.

Both of the lever arms M and N are made of flat sheet material so that the one is easily engaged by plunger E while the other is capable of closing off opening I of the valve body G. At the juncture of the two lever arms an aperture 49, extending parallel to the juncture of the two flat members, is provided for the purpose of receiving a pivot pin, not shown. The ends of the pivot pin may be inserted in the openings 41, 42, or in the openings 43, 44.

In the drawings valve member H is shown in a position such that the pivot pin is supported from openings 43, 44. It is then possible to adjust the setting of the set screw 17, and of plunger E, so that the opening I is normally closed by the short lever arm N, at the desired control pressure level of chamber C or any higher pressure. When valve member H is reversed so that the pivot pin occupies openings 41, 42 the mechanism is adjusted so that opening I is closed at the control pressure level or any lower pressure, while remaining open at higher pressures.

Main valve A is driven by a spring biased diaphragm in the usual, conventional manner, with the diaphragm action being controlled by pressure chamber B. It is possible to install a reverse closing main valve, so that the main valve may be selectively opened in response to decreasing pressure in the chamber B, rather than increasing pressure, as shown. It is also possible to invert the main valve arrangement so that the diaphragm is below the valve and above the spring, or so that the diaphragm is above the valve and below the spring.

In operation, the purpose of the regulator is to maintain the pipe line pressure on one particular side of main valve A as close as possible to a predetermined pressure level that is very near to atmospheric pressure. Necessary adjustments are made in the regulator settings to establish the desired control pressure level as the normal pressure for pilot valve chamber C. The pressure in chamber C (received from one side of main valve A) will tend to vary, however, both above and below its normal or nominal value.

The pressure or vacuum level of source F differs substantially from the desired control level of chamber C, hence source F generates either a substantial pressure or a substantial vacuum relative to atmospheric pressure. The pressure or vacuum level in chamber B, being a composite function of F and C, is of intermediate value.

The action of the regulator is such that pressure excursions within chamber C, in one direction from the control pressure level, are eliminated or minimized. With valve H suspended as shown the increases of pressure above the control level are eliminated, while in the reversed position of valve H the pressure decreases are eliminated.

The preferred operating arrangement is as shown in FIGURE 1, with main valve A being normally closed and valve member H being pivoted in its lower position as shown. The relatively constant pressure supplied by source F is then above atmospheric pressure and substantially above the normal pressure of the pilot valve chamber C, and the cooperative arrangement between the independent pressure source F, the main valve A, and the pilot valve mechanism is such that the operating energy for the main valve is derived substantially entirely from the source F. A pressure rise in the main line at the left hand side of main valve A is communicated via line 21 to pilot valve chamber C, causing diaphragm D and lever arm M to move upwardly so as to close the opening I, with the result that the pressure in chamber B rises and causes main valve A to open. After a suitable drop in line pressure at the left hand side of the main valve, opening I is opened, the pressure in chamber B drops, and main valve A is then closed by virtue of the stored energy of its associated spring. The restriction in passage K controls the flow volume from source F so that when valve H is moved from its closed position, in which the pressure in chamber B equals the pressure from F, to the open position, the larger passage I will pass the cumulative volumes of compressed gas from source F and from chamber B, allowing the pressure in B to fall to the pressure level in C.

Thus in the preferred operating arrangement as shown the main valve is opened in response to pressure from sources C and F and is closed by the stored energy of the spring, with neither action requiring any substantial amount of energy to be supplied from the compressed gas in pilot valve chamber C.

This form of the invention has been very successfully applied in regulating near atmospheric pressures to very close tolerances.

More specifically, in the oil fields it is a standard practice to store crude oil in fully enclosed tanks at a controlled pressure level ranging from two inches of water above atmospheric pressure to one half inch of water below atmospheric. This practice is followed in order to prevent lighter components of the oil from volatilizing and escaping into the atmosphere, with consequent loss of value. The pressure is controlled above the oil area, in the vapor phase or portion of the tank. In utilizing the invention for this purpose the main line at the left hand side of main valve A is coupled directly to the tank.

An advantage of the invention in the above application is its freedom from maintenance problems. More specifically, the crude oil vapors are rich, will condense easily, and the fluids thus deposited in pilot valve chamber C have a contaminating and corrosive effect. Source F is powered with a lean, dry gas, however, and since the flow of gas is always from source F through chamber C the latter is continuously purged or flushed of the contaminating oil vapors. The invention is therefore capable of years of continuous operation without requiring any maintenance.

Assuming that chamber C contains the highest of the three pressures, C, B, and F, and the right hand side of valve A and F are both operating at a vacuum, then the action is as follows. The restriction in passage K controls the flow of volumes of gas from chambers C and B so that, when passage I is opened, the pressure within C can flow into B for relieving the vacuum there, in addition to the volume of gas being pulled through K to F.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What I claim is:

1. A pressure control valve comprising a valve body having a first opening formed in one exterior surface portion thereof and second and third openings formed in other exterior surface portions thereof, said openings providing fluid passageways interconnected internally of said valve body; a pair of fulcrum means rigidly supported from said valve body on opposing sides of said first opening; and a valve member pivotally supported from one of said fulcrum means, said valve member having a short lever arm adapted to completely close said first opening and a long lever arm actuable for controlling the spacing of said short lever arm from said completely closed position, said lever arms being joined together at a right angle whereby said valve member is reversible between two alternate positions provided by said pair of fulcrum means.

2. A pressure control valve as claimed in claim 1 in which said valve member includes an elongated flat strip of sheet material, one end portion thereof providing said short lever arm, an adjoining portion being bent perpendicular to said end portion, the next adjoining portion being bent further in the same direction to form approximately a 45-degree angle with said end portion, the other end of said strip being bent in the opposite direction so as to form said long lever arm disposed at a right angle to said short lever arm; and which further includes an aperture formed at the inside corner of said first bend and adapted to receive a pivot pin supported from one of said fulcrum means.

References Cited in the file of this patent

UNITED STATES PATENTS

| | | |
|---|---|---|
| 1,724,891 | Anderson | Aug. 20, 1929 |
| 1,761,000 | Warner | June 3, 1930 |
| 1,814,530 | Spence | July 14, 1931 |
| 2,059,121 | Lake | Oct. 27, 1936 |
| 2,196,279 | Thomas | Apr. 9, 1940 |
| 2,408,685 | Rosenberger | Oct. 1, 1946 |
| 2,628,499 | Kleiss | Feb. 17, 1953 |
| 2,881,786 | Ogle et al. | Apr. 14, 1959 |

FOREIGN PATENTS

| | | |
|---|---|---|
| 495,177 | Germany | Apr. 3, 1930 |